(12) United States Patent
Seidenberg

(10) Patent No.: US 6,427,183 B1
(45) Date of Patent: Jul. 30, 2002

(54) CIRCUIT FOR THE DEMAND-CONFORMING SWITCHING ON AND OFF OF A LOAD

(75) Inventor: Stefan Seidenberg, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/124,498

(22) Filed: Jul. 29, 1998

(30) Foreign Application Priority Data

Jul. 29, 1997 (DE) ......................................... 197 32 675

(51) Int. Cl.⁷ ............................................. G06F 13/00
(52) U.S. Cl. ........................ 710/316; 713/300; 713/320; 713/340
(58) Field of Search ........................... 710/15, 18, 305, 710/316, 317; 713/340, 300, 320, 330; 709/206, 305; 365/226–227

(56) References Cited

U.S. PATENT DOCUMENTS

| | | | | |
|---|---|---|---|---|
| 5,379,441 A | * | 1/1995 | Watnabe et al. | 395/800 |
| 5,483,656 A | * | 1/1996 | Oprescu et al. | 713/300 |
| 5,675,813 A | * | 10/1997 | Holmdahl | 713/300 |

FOREIGN PATENT DOCUMENTS

| | | | |
|---|---|---|---|
| DE | 30 44 390 A1 | 6/1982 | |
| DE | 195 12 204 A1 | 8/1995 | |
| DE | 44 35 978 A1 | 4/1996 | |
| EP | 0 251 593 A2 * | 6/1987 | .......... H04M/11/06 |
| EP | 0251593 | 6/1987 | |
| EP | 0 417 788 A2 * | 6/1987 | .......... H04M/19/08 |
| EP | 0 251 593 A2 | 1/1988 | |
| EP | 0 417 788 A2 * | 3/1989 | .......... H04M/19/08 |
| EP | 0 417 788 A2 | 3/1991 | |

OTHER PUBLICATIONS

International Publication No. 95/28793 (Laidler), dated Oct. 26, 1995.

* cited by examiner

Primary Examiner—Ario Etienne
(74) Attorney, Agent, or Firm—Laurence A. Greenberg; Werner H. Stemer; Gregory L. Mayback

(57) ABSTRACT

A circuit for demand-conforming switching on and off of a load which is coupled to a data bus. The circuit has a sensor for detecting signal activity on the data bus and for outputting a corresponding signal. The circuit is defined by a first switching device, which connects the load to a voltage source which is independent of the data bus. The switching device connects the load to a voltage source when activity is detected on the data bus. The total power consumption of circuit and load can thus be minimized.

15 Claims, 1 Drawing Sheet

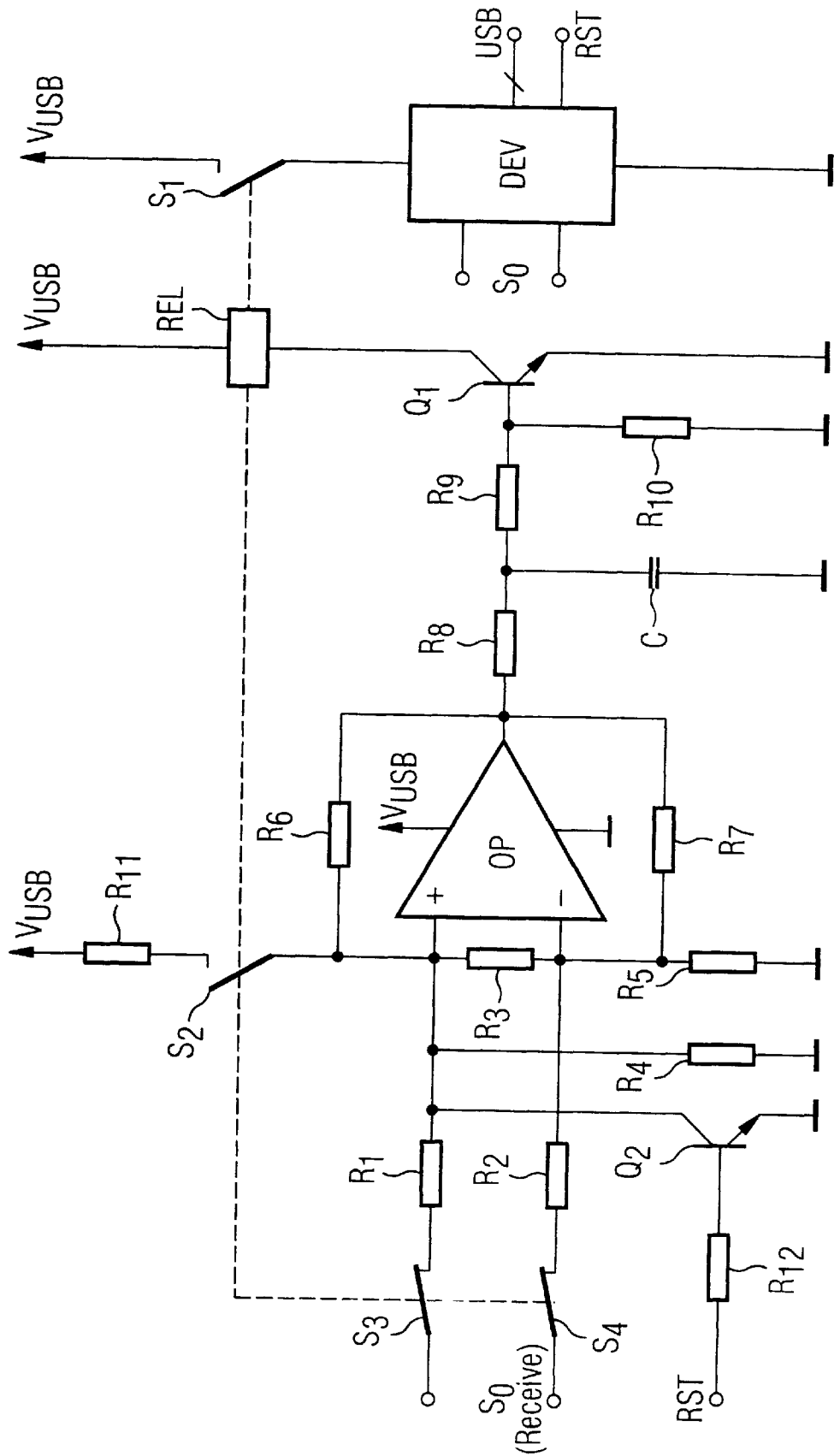

CIRCUIT FOR THE DEMAND-CONFORMING SWITCHING ON AND OFF OF A LOAD

BACKGROUND OF THE INVENTION

Field of the Invention

The invention relates to a circuit for demand-conforming switching on and off of a load. The load is coupled to a data bus and the circuit has a sensor for detecting activity on the data bus. The invention further relates to a subscriber terminal for an information network.

An information network contains a multiplicity of subscriber terminals which, at a specific point in time, neither receive information nor transmit information because only a fraction of the connected subscribers are regularly in communication with one another in the information network, and the information network is ultimately configured in such a way as well. Many subscriber terminals are therefore in an operating mode in which, although they do not participate actively in the data traffic, they must be ready at all times for accepting a connection to another subscriber. The subscriber terminals contain electrical circuits which consume current even in the standby state, that is to say in the aforementioned operating mode. In many information networks, such as the telephone network, for instance, the power required for the subscriber terminals is fed to the subscriber terminal via the network connection. It is natural, therefore, that the power consumption of a subscriber terminal must be limited to a low value. In other information networks, such as the Integrated Services Digital Network (ISDN), for instance, a subscriber terminal is not provided with any power from the information network. The subscriber terminal is therefore supplied with power from a separate voltage source. However, it is desirable in this case, too, to reduce the power consumption of the subscriber terminal to a minimum.

An apparatus which makes it possible to minimize the current consumption of a telecommunications terminal which is supplied with current by the analouge subscriber line of the telecommunications network is described in International Patent Application WO 95/28793 corresponding to U.S. Pat. No. 5,608,792, issued Mar. 4, 1997. The circuit has a device for detecting a ringing tone in order to be able to switch a voltage supply circuit between two operating modes. The voltage supply circuit has an oscillator which can operate at different frequencies and a DC voltage converter circuit. The oscillator is supplied with power by the voltage between the connections of the subscriber line, which power is transferred to the circuit of the apparatus by the DC voltage converter. A power supply of the apparatus which is independent of the subscriber line is therefore not provided.

A bus system for the ISDN for use in private domestic environments is disclosed in U.S. Pat. No. 5,379,441. The system has a detector for detecting the signal INFO2 of the ISDN on a two-wire subscriber line. The signal is evaluated in order to be fed to a specific subscriber terminal connected to the bus system. For this purpose, relays are used to connect the subscriber terminal addressed by the incoming signal to the bus system. U.S. Pat. No. 5,379,441, however, does not contain any information with regard to switching on and off of a subscriber terminal or the structure of an INFO2 detector.

SUMMARY OF THE INVENTION

It is accordingly an object of the invention to provide a circuit for the demand-conforming switching on and off of a load which overcomes the above-mentioned disadvantages of the prior art devices of this general type, in which the average power consumption of a load coupled to a data bus is minimized.

With the foregoing and other objects in view there is provided, in accordance with the invention, in a circuit for demand-conforming switching on and off of a load coupled to a data bus, the improvement including: a sensor connected to the data bus for detecting signal activity on the data bus and for outputting a corresponding signal; a switching device for connecting a load to a voltage source being independent of the data bus, and the switching device receives the corresponding signal and connects the load to the voltage source when activity is detected by the sensor.

The circuit for the demand-conforming switching on and off of a load coupled to a data bus has a sensor. The sensor is able to detect signal activity on the data bus and, in the event of activity, to output a signal which indicates the presence of activity. The circuit is defined by a first switching device, which can connect the load to a voltage source and which is independent of the data bus. The connection is initiated by the signal coming from the sensor. The circuit has the advantage that the apparatus, which, conventionally, would continually have to monitor the activities on the data bus in a standby state, is supplied with power only when activity is ascertained on the data bus. This is advantageous particularly when the power consumption of the load lies above specific limit values in its standby state. The total power consumption of the circuit and the load can be minimized using the circuit according to the invention.

In accordance with an added feature of the invention, there is another switching device connected to the sensor for keeping the load connected to the voltage source when the signal activity at the sensor ceases. The second switching device keeps the load connected to the voltage source when the signal activity at the sensor stops. This is particularly advantageous when the sensor is disconnected from the data bus after the apparatus has been connected to the voltage source, and the signal which indicates activity would thus stop.

In accordance with an another feature of the invention, there is a further switching device for disconnecting the sensor from the data bus after the load has been connected to the voltage source. The third switching device disconnects the circuit from the data bus after the load has been connected to the voltage source. The disconnection of the circuit from the data bus has the advantage that the data traffic on the data bus is not influenced by the circuit and its sensor, over and above a minimum period of time.

In accordance with an additional feature of the invention, there is a disconnecting circuit connected to the sensor for disconnecting the load from the voltage source when a reset signal is received by the disconnecting circuit. In this case, it is particularly advantageous if the reset signal is output by the load. It is thus possible for the load to disconnect itself from its power supply.

In accordance with a further additional feature of the invention, the switching device has a relay and the relay is either an electronic relay or a mechanical relay. In addition, the relay can simultaneously actuate all of the switching devices.

In accordance with yet another feature of the invention, the sensor includes a differential amplifier with input connections connected to the data bus and the differential amplifier has a positive feedback resistor and/or a negative feedback resistor. The circuit has, as its sensor, a differential amplifier whose input terminals are coupled to the data bus. The differential amplifier is preferably equipped with feedback, which is provided either as negative feedback or as positive feedback. In the case of positive feedback, the effect is that even when there is only brief activity on the data bus, the output signal of the differential amplifier continues to rise even when the activity disappears, and consequently actuates the switching device. In the case of a negative feedback differential amplifier, activity which is present at least during the settling process of the circuit is necessary on the data bus in order to actuate the switching device. The actuation of the switching device is preferably additionally delayed by connecting a low-pass filter upstream of the switching device, which filter delays the rise of the output signal of the differential amplifier.

In accordance with yet another additional feature of the invention, the sensor is supplied with voltage by the voltage source. It is particularly preferred for the circuit according to the invention to be supplied with voltage likewise from the voltage source which is independent of the data bus.

With the foregoing and other objects in view there is provided, in accordance with the invention, a subscriber terminal for an information network, including: a load having a data bus; and a circuit having a sensor connected to the data bus for detecting signal activity on the data bus and for outputting a corresponding signal, the circuit having a switching device for connecting the load to a voltage source being independent of the data bus, and the switching device receiving the corresponding signal and connecting the load to the voltage source when activity is detected by the sensor.

In accordance with an added feature of the invention, the data bus is an $S_0$ receiving bus of an ISDN subscriber terminal. The circuit can then be used with particular advantage because the $S_0$ receiving bus in the ISDN is suitable for feeding power to the subscriber terminal only with the addition of relatively expensive transformers.

In accordance with a concomitant feature of the invention, the load and the circuit form a subscriber terminal for an integrated services digital network.

It is particularly preferred to use the circuit in a subscriber terminal for an information network. The parts of the subscriber terminal which lie outside the circuit of the invention then form the load in the sense of the above explanations. In this case, it is preferred for the information network to be an Integrated Services Digital Network (ISDN).

Other features which are considered as characteristic for the invention are set forth in the appended claims.

Although the invention is illustrated and described herein as embodied in a circuit for the demand-conforming switching on and off of a load, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a schematic diagram of a circuit in conjunction with a load to be switched according to the invention.

DESCRIPTION OF THE PREFERRED EMBODIMENTS

Referring now to the single FIGURE of the drawing in detail, there is shown an apparatus DEV to be switched, which has connections for an $S_0$ bus of an Integrated Services Digital Network (ISDN), on the one hand, and connections USB for a PC bus system, on the other hand. The configuration of the $S_0$ bus in the ISDN is appropriately known in the art, and in this regard reference is made to the extensive literature and a detailed explanation at this point is dispensed with. In particular, the transformers for the connection to the $S_0$ bus which are usually required for DC-decoupling are not illustrated in FIG. 1, for reasons of simplifying the circuit diagram.

In the $S_0$ bus of the ISDN, there are only limited possibilities for supplying an apparatus connected to the $S_0$ bus, in particular apparatuses having a supply voltage of 5V, with power from the $S_0$ bus. This would require current-compensated transformers, which are expensive and, moreover, limited in their current loading capacity. Moreover, the $S_0$ bus must not be loaded beyond the specification, which is critical particularly when a plurality of load capacitors are present on the $S_0$ bus. Many apparatuses connected to the $S_0$ bus therefore require a power supply which is independent of the $S_0$ bus.

In the preferred exemplary embodiment, the apparatus DEV is connected, on the other hand, as mentioned, to the PC bus system USB (Universal Serial Bus). In the bus system USB, there is provision for apparatuses which are connected to the bus to be supplied with power from the bus system USB. However, the specifications of the bus system USB allow the apparatus DEV to draw power from the bus system USB only to a limited extent. According to the invention, therefore, there is provision for an apparatus DEV connected to the bus system USB to be completely disconnected from the power supply when the apparatus DEV is not in operation.

The FIGURE illustrates how the apparatus DEV is connected via a switch S1 to the voltage source $V_{USB}$ contained in the bus system USB. If the switch S1 is closed, then the apparatus DEV is supplied with voltage and can thus begin operating. In the present exemplary embodiment, the operation of the apparatus DEV consists in the communication of data between the $S_0$ bus in the ISDN and the PC bus system USB. What is typically involved is a communications IC.

In order to actuate the switch S1, a circuit according to the invention is provided, as illustrated to the left of the apparatus DEV in the FIGURE. The circuit essentially has a differential amplifier OP, which is configured as an operational amplifier and supplies a corresponding signal at its output connection when there is signal activity on the $S_0$ receiving bus in the ISDN, and a relay circuit having a driving transistor Q1 and a relay REL, which is essentially driven by the output signal of the operational amplifier OP. The two connections of the $S_0$ receiving bus are in each case connected via a switch S3 and a resistor R1 and, respectively, via a switch S4 and a resistor R2 to the positive and to the negative input, respectively, of the operational amplifier OP. Furthermore, the input connections are connected together by a resistor R3 and are respectively connected to ground via resistors R4 and R5. The resistors R1 to R5 preferably have identical resistances, a value of 47 kΩ in the preferred exemplary embodiment.

The output connection of the operational amplifier OP is connected via a resistor R6 to the positive input of the operational amplifier, which effects positive feedback. The output connection of the operational amplifier OP is connected via a resistor R7 to the negative input of the operational amplifier OP, which effects negative feedback. If R6 is less than R7, then the operational amplifier OP is connected with positive feedback. If given only a small input signal, the output signal rises in a self-maintained manner on account of the positive feedback (progressive behavior). However, if the resistor R7 is smaller than the resistor R6, then the operational amplifier OP is connected with negative feedback and the output signal of the operational amplifier OP returns to the quiescent state when a signal is no longer applied to the input (degressive behavior). The positive input connection of the operational amplifier OP is furthermore connected to the voltage source $V_{USB}$ via a switch S2 and a resistor R11. When the switch S2 is closed, a signal which always leads to a high output signal of the operational amplifier OP is applied to the inputs of the operational amplifier OP. The operational amplifier OP is supplied with power from the voltage source $V_{USB}$.

The output connection of the operational amplifier OP is connected to a low-pass filter including a resistor R8 and a capacitor C. The capacitor C forms a charging capacitance which delays the rise of the output signal of the operational amplifier in accordance with dimensioning of the resistor R8 and of the capacitor C. The output signal of the low-pass filter is fed to a voltage divider formed of a resistor R9 and a resistor R10. The voltage tapped on the voltage divider is fed to the control connection (gate) of a transistor Q1. In the preferred exemplary embodiment, this is an npn bipolar transistor whose emitter is connected to ground. The collector-side load path of the transistor Q1 is connected to the voltage supply $V_{USB}$ via the control connections of the relay REL. The relay REL in this case has an internal resistance (not specifically illustrated). It actuates the switches S1 and S2 and the switches S3 and S4.

The circuit furthermore has a disconnecting circuit, which is formed from a transistor Q2 and a resistor R12. The load path of the transistor Q2 is connected between the positive input connection of the operational amplifier OP and ground. At its first connection, the resistor R12 is connected to the control connection of the transistor Q2. The transistor Q2 likewise consists of an npn bipolar transistor in the preferred exemplary embodiment. A reset signal can be applied to the second connection of the resistor R12, the effect of which reset signal is that the transistor Q2 is activated and, consequently, the positive input connection of the operational amplifier OP is pulled to ground. In the preferred exemplary embodiment, the reset signal RST is output by the load DEV.

As mentioned, the operational amplifier OP can be configured in a degressive or a progressive behavior. In the event of a progressive behavior, that is to say R6 is less than R7, an activity which is only brief on the $S_0$ receiving bus leads to a rise of the output signal of the operational amplifier OP. The driving signal at the control connection of the transistor Q1 also rises, with a delay. The transistor Q1 finally turns on, with the result that the relay REL which may be of electronic or mechanical construction pulls in and thereby actuates the switch S1. As a result, the load DEV is connected to the supply voltage $V_{USB}$ and can begin operating. The switch S2 is not required in this configuration because the output signal of the operational amplifier OP remains at a high level, even when the activity on the $S_0$ receiving bus disappears, the relay REL consequently remains pulled in and the load remains connected to the supply voltage $V_{USB}$ via the switch S1.

In the degressive configuration, the driving signal at the control connection of the transistor Q1 essentially follows the activity on the $S_0$ receiving bus. When the activity disappears, for example because the load is currently transmitting on the $S_0$ transmitting bus, the driving signal at the control connection of the transistor Q1 also disappears, the relay REL drops out again and the switch S1 opens again. The load would in this way be disconnected again from the supply voltage source. In order to prevent this, the switch S2 is provided in the degressive configuration and connects the positive input connection of the operational amplifier OP to the supply voltage $V_{USB}$ via the resistor R11. The effect of this is that a sufficient voltage difference remains at the input connections of the operational amplifier OP, so that the transistor Q1 remains in the on state and, consequently, the relay REL remians pulled in. The switch S2 thus effects self-latching of the circuit and the load DEV remains permanently connected to the supply voltage source $V_{USB}$ in the degressive configuration as well. The degressive configuration is particularly advantageous because interfering peaks are suppressed in that case.

When the load, which typically has a communications circuit, has ended communication with the $S_0$ bus in the ISDN, it outputs at its connection RST a high-level signal which is passed via the resistor R12 to the control connection of the transistor Q2. The transistor Q2 thus turns on and the positive input connection of the operational amplifier OP is essentially pulled to ground. As a result, the level at the output connection of the operational amplifier OP also falls and, with a delayed action, and the level at the control connection of the transistor Q1 also falls. The transistor Q1 finally opens its load path, the relay REL drops out and the switches S1 and S2 are opened. The circuit then returns to its quiescent state, in which the circuit is in a standby state.

Moreover, in the exemplary embodiment of the circuit according to the invention, the switches S3 and S4 are provided. With the switches S3 and S4, the circuit is disconnected from the $S_0$ receiving bus at the instant at which the load DEV is connected to the supply voltage source $V_{USB}$ and thus begins operating. The disconnection of the circuit from the $S_0$ receiving bus may be desirable if the circuit corrupted the behavior of the $S_0$ receiving bus to an excessively great extent. As illustrated, the switches S1 and S2 and the switches S3 and S4 are jointly actuated by the relay REL. The circuit of the invention identifies incoming calls on the ISDN bus (so-called INFO signals on the $S_0$ receiving bus or on the T bus of the ISDN) and thus excites a relay, which switches on a load. The load is, for example, a device with ISDN capability, in particular a communications circuit IC. The responsiveness of the circuit can be set by way of the dimensioning of the low-bus filter, connected upstream of the control connection of the transistor Q1, and the voltage divider.

In the degressive configuration, the circuit according to the invention automatically returns to the quiescent state when the data traffic on the ISDN receiving line disappears (that is to say a connection no longer exists or the connection has been cleared down). If the load is retained even when the activity on the ISDN receiving bus disappears, as is the case in the progressive configuration or in the degressive configuration with self-latching switch S2, then the switching off of the load is triggered by a reset signal RST, which can either be applied externally or is output by the load itself. Consequently, the load can disconnect itself from its voltage source $V_{USB}$. In the standby state, the voltage source $V_{USB}$ is thus loaded only by the operation of the circuit, that is to say essentially by the quiescent current of the operational amplifier OP.

I claim:

1. In a circuit for demand-conforming switching on and off of a load coupled to a data bus, the load having a load power consumption, and the data bus having a data bus consumption limit when in a standby state, the improvement comprising:
   a sensor connected to the data bus for detecting signal activity on the data bus and for outputting a corresponding signal;
   a first switching device for connecting the load to a voltage source independent of the data bus preventing the data bus consumption limit from being exceeded, said first switching device receiving said corresponding signal from said sensor and connecting the load to the voltage source when activity is detected by said sensor and the load power consumption exceeds the data bus consumption limit;
   a second switching device for disconnecting the load from the data bus after said first switching device has connected the load with the voltage source; and
   a common relay connected to said sensor and actuating said first switching device and said second switching device when said sensor detects signal activity on the data bus.

2. The circuit according to claim 1, including another switching device connected to said sensor for keeping the load connected to the voltage source when the signal activity at said sensor stops.

3. The circuit according to claim 1, including a disconnecting circuit connected to said sensor for disconnecting the load from the voltage source when a reset signal is received by said disconnecting circuit.

4. The circuit according to claim 3, wherein the reset signal is output by the load.

5. The circuit according to claim 1, wherein said relay is an electronic relay.

6. The circuit according to claim 1, wherein said relay is a mechanical relay.

7. The circuit according to claim 1, wherein said sensor includes a differential amplifier with input terminals connected to the data bus.

8. The circuit according to claim 7, wherein said differential amplifier has positive feedback.

9. The circuit according to claim 7, wherein said differential amplifier has negative feedback.

10. The circuit according to claim 1, including a low-pass filter connected upstream of said first switching device.

11. The circuit according to claim 1, wherein said sensor is supplied with voltage by the voltage source.

12. A subscriber terminal for an information network, comprising:
   a load having a data bus; and
   a circuit having a sensor connected to said data bus for detecting signal activity on said data bus and for outputting a corresponding signal, said circuit having a first switching device, a second switching device, and a common relay, said first switching device being for connecting said load to a voltage source independent of said data bus, receiving said corresponding signal from said sensor, and connecting said load to the voltage source when activity is detected by said sensor and a load power consumption exceeds a data bus consumption limit, said second switching device for disconnecting said load from said data bus after said first switching device has connected said load to said voltage source, and said common relay connected to said sensor and actuating said first switching device and said second switching device when said sensor detect signal activity on the data bus.

13. The subscriber terminal according to claim 12, wherein said data bus is an $S_0$ receiving bus of an ISDN subscriber terminal.

14. The subscriber terminal according to claim 12, wherein said load and said circuit form a subscriber terminal for an integrated services digital network.

15. In a circuit for demand-conforming switching on and off of a load coupled to a data bus, the load having a load power consumption, and the data bus having a data bus consumption limit when in a standby state, the circuit including a sensor connected to the data bus for detecting signal activity on the data bus and for outputting a corresponding signal, a first switching device for connecting the load to a voltage source independent of the data bus preventing the data bus consumption limit from being exceeded, a second switching device for disconnecting the load from the data bus after the first switching device has connected the load to the voltage source, and a common relay connected to the sensor and actuating the first switching device and the second switching device when the sensor detects signal activity on the data bus, a method for preventing the data bus consumption limit from being exceeded, which comprises:
   determining the data bus consumption limit;
   connecting the load to the voltage source when activity is detected by the sensor if the load power consumption is greater than the data bus consumption limit; and
   disconnecting the load from the data bus after the load has been connected to the voltage source.

* * * * *